United States Patent
Graga

(10) Patent No.: US 9,103,125 B2
(45) Date of Patent: Aug. 11, 2015

(54) SNOW/ICE DAM BRACKET FOR SOLAR PANELS

(76) Inventor: Richard Graga, Farmingdale, NJ (US)

( * ) Notice: Subject to any disclaimer, the term of this patent is extended or adjusted under 35 U.S.C. 154(b) by 838 days.

(21) Appl. No.: 13/374,085

(22) Filed: Dec. 12, 2011

(65) Prior Publication Data

US 2013/0146126 A1 Jun. 13, 2013

(51) Int. Cl.
*E04B 1/38* (2006.01)
*E04D 13/10* (2006.01)
*H02S 20/23* (2014.01)
*F24J 2/46* (2006.01)

(52) U.S. Cl.
CPC ............ *E04D 13/10* (2013.01); *F24J 2/4607* (2013.01); *H02S 20/23* (2014.12); *Y02B 10/12* (2013.01); *Y02B 10/20* (2013.01); *Y02E 10/40* (2013.01)

(58) Field of Classification Search
CPC .......... E04D 13/10; E04D 1/34; F24J 2/4607; F24J 2/5245; H02S 20/23; H02S 20/00; Y02B 10/12; Y02B 10/20; Y02E 10/40; Y02E 10/47; Y02E 10/50
USPC ....................................... 52/173.3, 24, 25, 26
See application file for complete search history.

(56) References Cited

U.S. PATENT DOCUMENTS

| | | | | |
|---|---|---|---|---|
| 401,202 A * | 4/1889 | O'Gara | ............................. | 52/24 |
| D30,788 S * | 5/1899 | Clark | ............................. | D8/499 |
| 654,438 A * | 7/1900 | Clark | ................................ | 52/24 |
| 1,530,233 A * | 3/1925 | Campbell | ........................ | 52/24 |
| 3,289,361 A * | 12/1966 | Holliday | ........................... | 52/24 |
| 3,296,750 A * | 1/1967 | Zaleski | ............................. | 52/24 |
| 5,070,660 A * | 12/1991 | Willa | ................................ | 52/24 |
| 5,371,979 A * | 12/1994 | Kwiatkowski et al. | ........... | 52/24 |
| 5,570,557 A * | 11/1996 | Kwiatkowski et al. | ........ | 52/630 |
| 5,609,326 A * | 3/1997 | Stearns et al. | ............... | 256/12.5 |
| 5,655,334 A * | 8/1997 | Kwiatkowski | .................... | 52/24 |
| 5,669,184 A * | 9/1997 | Anderson | ......................... | 52/26 |
| 6,070,368 A * | 6/2000 | Anderson | ......................... | 52/24 |
| D610,443 S * | 2/2010 | Fisher | ........................... | D8/499 |
| 7,874,105 B2 * | 1/2011 | Jacobs et al. | ..................... | 52/26 |
| 7,921,605 B2 * | 4/2011 | Jacobs et al. | ..................... | 52/26 |
| 8,763,322 B2 * | 7/2014 | Hamamura | .................. | 52/173.3 |
| 2007/0245636 A1 * | 10/2007 | Ayer et al. | ........................ | 52/24 |
| 2012/0079781 A1 * | 4/2012 | Koller | .......................... | 52/173.3 |
| 2013/0333305 A1 * | 12/2013 | Stearns et al. | .................... | 52/24 |
| 2014/0157694 A1 * | 6/2014 | Jenkins | ........................ | 52/173.3 |
| 2014/0326838 A1 * | 11/2014 | West et al. | .................. | 248/74.2 |

\* cited by examiner

*Primary Examiner* — Joshua J Michener
*Assistant Examiner* — Matthew Gitlin
(74) *Attorney, Agent, or Firm* — Clifford G. Frayne

(57) ABSTRACT

A non-intrusive solar panel bracket for the prevention of the sudden displacement of large amounts of snow and ice from solar panels mounted on a pitched roof, the brackets selectively snap fit over the lower horizontal frame member of a solar panel, a portion of the bracket extending upwardly above the level of the solar panel preventing the downward displacement of snow and ice, yet at a height so as not to interfere with the solar panels generation of electricity.

6 Claims, 3 Drawing Sheets

SNOW/ICE DAM BRACKET FOR SOLAR PANELS

BACKGROUND OF THE INVENTION

1. Field of the Invention

The present invention relates to solar panels, and in particular, solar panels positioned on a pitched roof, and a snow/ice dam bracket which is not intrusively fastened, but easily "sandwiched" or snap fit between the first and second row of the solar panels and prevents the sudden displacement of large amounts of snow/ice from the solar panels and the roof.

2. Description of the Prior Art

The increase in awareness with respect to energy conservation has led to a significant increase in the use and installation of solar panels for the generation of electrical energy from renewable resources, i.e. the sun. In rural areas vast arrays of solar panels can be erected on what are termed "solar farms", where the panels are erected and placed on frames which are directly supported by the underlying earth and oriented to make maximum use of available sunlight.

In suburban and urban areas, vacant land is not as readily available so as to lend itself to the development of solar farms. In suburban and urban areas, the most advantageous location for the placement of solar panels is normally on the roof. There therefore has been a significant increase in the installation and use of solar panels on roofs, not only of individual dwelling units, but multiple dwelling units, commercial buildings such as strip malls and larger malls, and industrial buildings, such as factories and warehouses.

In many of these installations, the roofs upon which the solar panels are mounted are flat, such as warehouses and the like, and the panels are arrayed in either a horizontal position or mounted on frames that allow for an angular mount to make more effective use of the declination of the sun's rays impacting the solar panels. In these instances, the solar panels are erected and mounted side by side and not in a vertical arrangement.

In the instance of certain dwelling units and certain commercial and industrial buildings, and churches, the roofs are pitched such that to make maximum use of solar panels, the solar panels are mounted on the roofs, but are mounted in rows or matrices to take advantage of maximum roof coverage.

The solar panels mounted as aforesaid on a pitched roof present a substantial problem which the Applicant has addressed. An array or matrix of solar panels on a pitched roof in a cold climate will accumulate snow and possibly ice on the solar panels. The snow will accumulate during a snow storm, however, as soon as the storm abates and sunlight is available, the underlying solar panels will begin to heat up regardless of the amount of accumulation of snow which covers them. This heating from solar activity will immediately begin to melt the layer of snow immediately adjacent the solar panel, which may freeze in the form of ice in non-daylight hours. This melting process will be happening simultaneously on each adjacent solar panel in the array or matrix on the pitched roof.

Depending upon the intensity of the solar activity and the length of time, large sheets of snow and possibly ice, are displaced from the solar panels under the influence of gravity on the pitched roof and the underlying melting snow such that these large sheets of snow/ice will slide over the edge of the roof.

Depending upon the surrounding geography of the building, and its layout, one of several hazardous situations may occur. (1) The sliding snow and ice may fall upon heating and air conditioning units located adjacent the base of the building, and possibly damaging same. (2) The snow and ice sheet may engage a recreational portion on the exterior of a dwelling unit, such as a deck patio area, and again damage the dwelling unit or exterior facilities, such as barbeques and the like. (3) There may be a walkway or sidewalk immediately adjacent the building and under the pitched roof, which could subject pedestrians to injuries from the falling snow or ice. (4) A parking area could be immediately adjacent the building having the pitched roof, and vehicles may be damaged from the falling snow and ice.

There therefore has been a need for some form of retainer that would prevent the slippage of snow/ice from an array or matrix of solar panels mounted on a pitched roof. One early method was to install upright barriers along their lower most edge on the pitched roof to prevent such slippage. However, these barriers when not required to prevent the slippage of snow and ice, would cast shadows onto the solar panels, blocking the sunlight, and thereby decreasing the efficiency of the solar panels. There therefore has been a need for a more efficient way to prevent the slippage of snow and ice from an array or matrix of solar panels mounted on a pitched roof without affecting the efficiency of the solar panels and allowing the solar panels to heat the snow and ice and allow for water runoff as a normal course without the significant displacement and slippage of large quantities of snow and ice.

It should be pointed out that any solution to the problem that involves the physical intrusive fastening of a device to a solar panel is unacceptable in that it would automatically void any warranty associated with the solar panel.

OBJECTS OF THE INVENTION

An object of the present invention is to provide for a novel snow/ice dam bracket which can be snap fit, but not intrusively fastened, onto the frame of a solar panel and prevent the slippage and displacement of large quantities of snow/ice and allow for the solar panel to melt the snow/ice for runoff in the form of liquid water.

A still further object of the present invention is to provide for a novel snow/ice dam bracket which can be universally fit to different varieties of solar panels.

A still further object of the present invention is to provide for a novel snow/ice dam bracket which will prevent the displacement and slippage of snow and ice from a solar panel, but will not affect the efficiency of the solar panel in the absence of snow/ice.

A still further object of the present invention is to provide for a novel snow/ice dam bracket which can be selectively installed on new solar panel arrays or on existing solar panel arrays.

SUMMARY OF THE INVENTION

A non-intrusive solar panel bracket for the prevention of the sudden displacement of large amounts of snow and ice from solar panels mounted on a pitched roof, the brackets selectively snap fit over the lower horizontal frame member of a solar panel, a portion of the bracket extending upwardly above the level of the solar panel preventing the downward displacement of snow and ice, yet at a height so as not to interfere with the solar panels generation of electricity.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
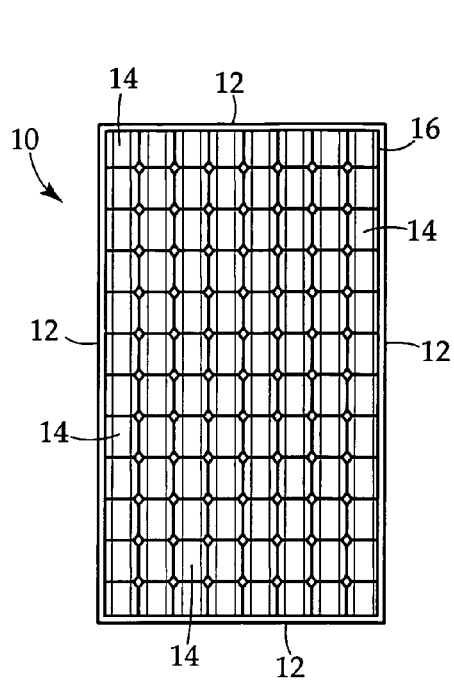
FIG. 1 is a front view of a typical solar panel.
Figure 2:
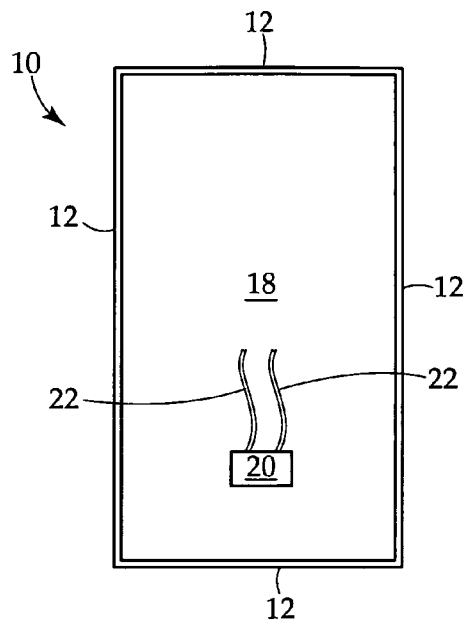
FIG. 2 is a rear view of a typical solar panel.

FIG. 1 is a front view of a typical solar panel 10. It is formed of a peripheral frame 12 which is normally fabricated from anodized aluminum alloy or stainless steel. Frame 12 encloses a plurality of solar cells 14, solar cells 14 being a poly-crystaline construction and are normally sized 156 mm×156 mm (6 in.×6 in.). The solar cells are overlaid by a tempered glass cover 16 of approximately 4 mm thickness. The rear 18 of the solar panel (FIG. 2) contains a junction box 20 with the appropriate electrical connections and cables 22 to connect the solar panel to an array or matrix of additional solar panels and thence to the electrical system.

Each solar panel is self-contained and therefore if an individual wished to use only one solar panel, the solar panel as illustrated in FIG. 1 would suffice and could be hooked up to the electrical system and would generate electricity. However, in all likelihood, the individual would desire an array or matrix of solar panels to increase the electrical output.

Figure 3:
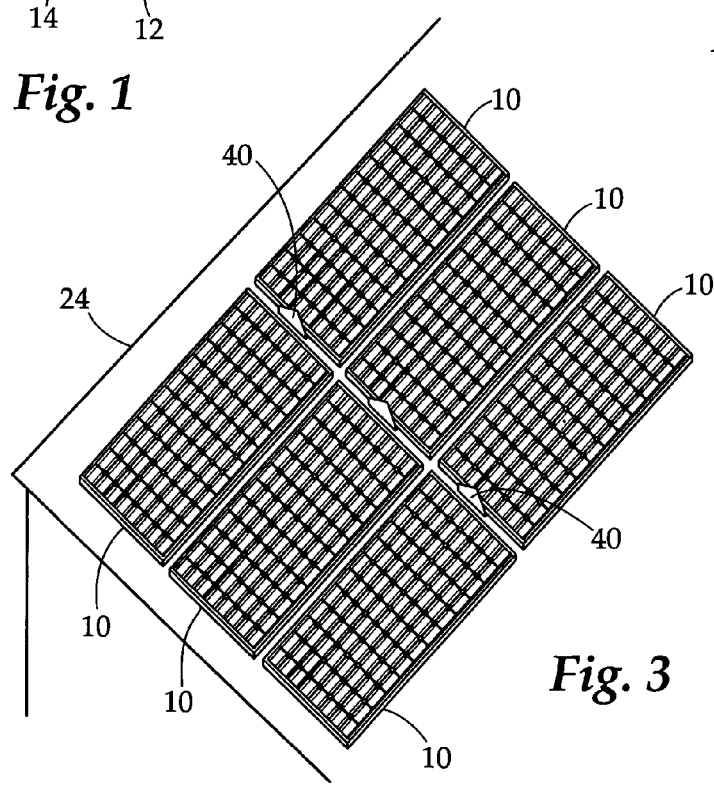
FIG. 3 is a perspective view of an array or matrix of solar panels illustrating a typical installation on a pitched roof.

FIG. 3 illustrates a typical pitched roof 24 having an array of the solar panels 10 as illustrated in FIG. 1 secured thereto. The solar panels 10 themselves are not secured directly to the roof, but rather fit into a framing system (not shown) which is secured to the roof. The solar panels 10 are then connected to each other in series utilizing the electrical connections and cables 22 secured to junction box 20, and the final solar panel in the series is secured by cable to an electrical junction box within the building.

The accumulation of snow on a pitched roof as illustrated in FIG. 3 with an array of solar panels positioned thereon presents particular problems when the snow has ceased. The solar panels will react to sunlight, even when covered with snow, and then the solar panels will be activated and the tempered glass cover 16 will begin to heat up. This will cause a melting of the snow immediately adjacent the tempered glass cover 16 and lead to an instability of the snow mass on the pitched roof in that unmelted snow is now resting on a layer of fluid. What occurs is similar to that of a snow layer on the roof of a vehicle. Once the vehicle heats up, the snow layer is likely to shift rearwardly under acceleration or forwardly under braking. In the situation with a pitched roof, there is no acceleration or braking, but merely the action of gravity to a mass of snow resting upon a smooth, slick surface having a thin film of fluid thereon.

Figure 4:
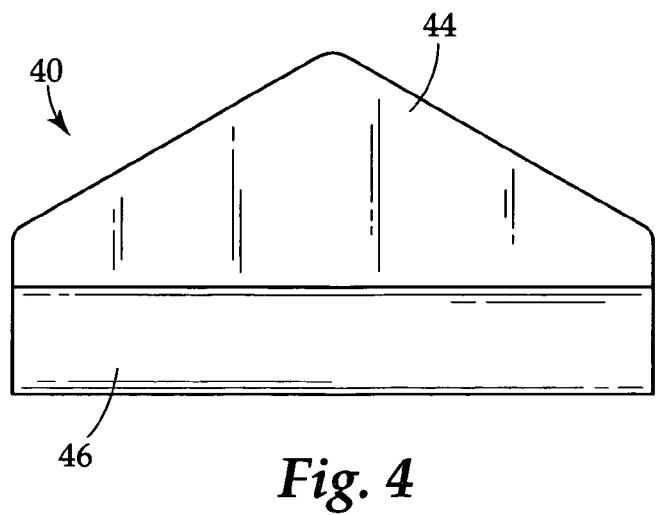
FIG. 4 is a front view of the snow/ice dam bracket of the present invention.
Figure 5:
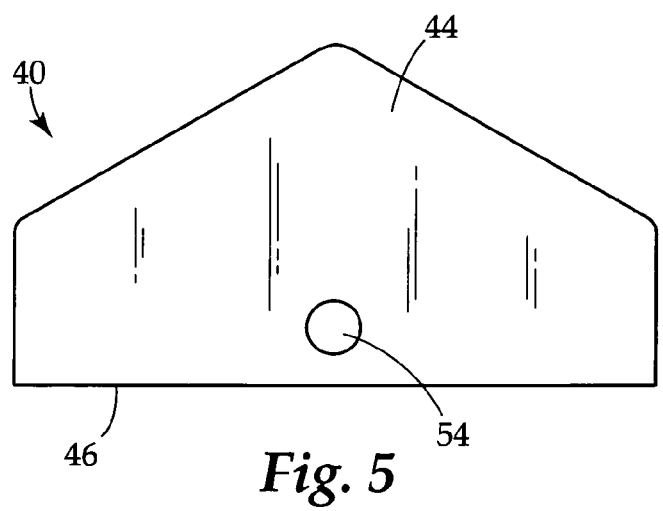
FIG. 5 is a rear view of the snow/ice dam bracket of the present invention.
Figure 6:
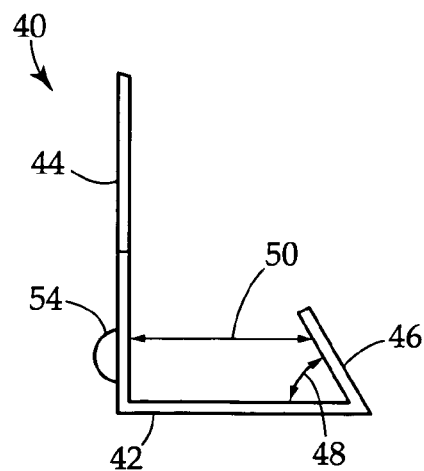
FIG. 6 is a side view of the snow/ice dam bracket of the present invention.

There therefore has been a need to prevent the displacement of a large quantity of snow downwardly and off of the roof. The retention must be accomplished without any intrusive fastening of objects to solar panels 10 which would void the warranties. Applicant's solution is illustrated in FIGS. 4, 5, and 6, which are a front, rear, and side view of Applicant's snow/ice dam bracket 40, FIG. 7 being a side close up view of the installed snow/ice dam bracket 40, FIG. 8 being a perspective view of the snow/ice dam bracket 40, and FIG. 9 being a perspective view of a second embodiment of the snow/ice dam bracket.

The snow/ice dam bracket 40 comprises a bottom wall 42, a perpendicular upstanding rear wall 44, and a front wall 46, which forms an acute angle 48 with bottom wall 42. The width 50 of bottom wall 42 is designed to accommodate the width of a frame element of frame member 12 of solar panel 10. The width of bottom wall 42 and the angled and shorter front wall 46 allow for the snow/ice dam bracket 40 to be snap fit under the frame element of solar panel 10 such that rear wall 44 extends upwardly, a distance above tempered glass cover 16 and serves as a backstop or dam to any snow mass above it on the pitched roof. The rear wall 44 of snow/ice dam bracket 40 may also be formed with a resilient polymer or rubber button 54 for frictional contact with the immediately adjacent, lower solar panel 10 to insure against dislodgement.

Figure 7:
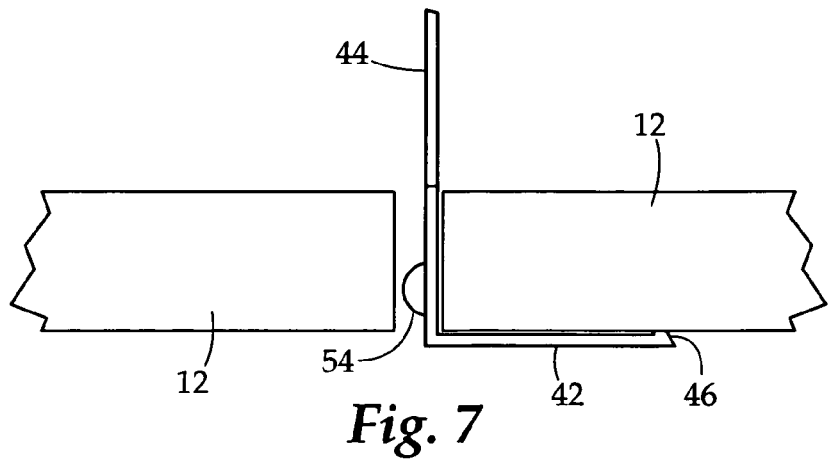
FIG. 7 is a side close up view of the snow/ice dam bracket of the present invention installed.

FIG. 7 is a side close up view illustrating the installation of the snow/ice dam bracket 40 to one portion of a frame 12 of a solar panel 10 and illustrates the distance between adjacent solar panels so as to sandwich rear wall 44 between the solar panels with a portion of rear wall 44 extending above the level of the tempered glass cover 16.

Figure 8:
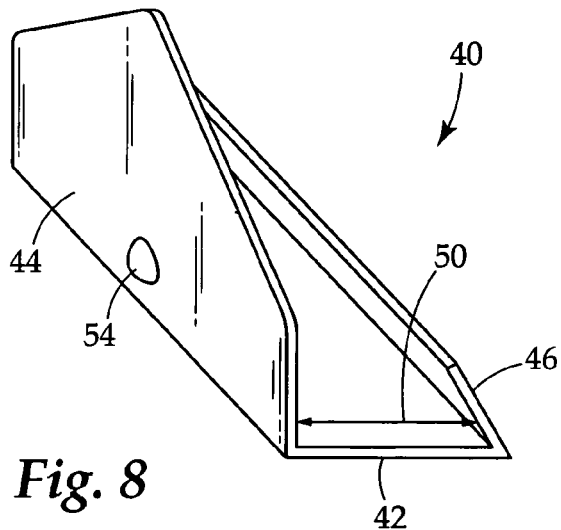
FIG. 8 is a perspective view of the snow/ice dam bracket of the present invention.
Figure 9:
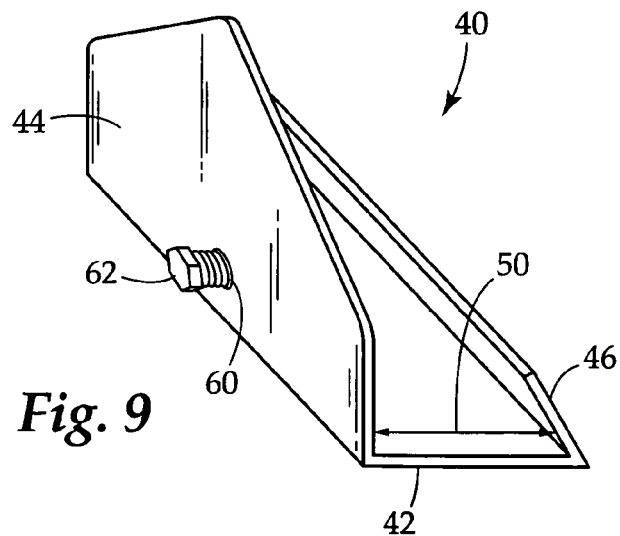
FIG. 9 is a perspective view of a second embodiment of the snow/ice dam bracket of the present invention.

The snow/ice dam bracket 40 would be selectively positioned to solar panels 12 on a pitched roof. As illustrated in FIG. 8, the bracket is snap fit and sandwiched between adjacent solar panels. It is therefore recommended that the snow/ice dam bracket 40 not be secured on the lowest position solar panels 10 on a pitched roof, but rather, sandwiched between the lowest level or row and the level or row immediately above it. Selective positioning of the snow/ice dam bracket 40 on such an array is illustrated in FIG. 3.

It should be remembered that the snow/ice dam bracket 40 will not prevent a certain amount of snow from melting and sliding from the roof. The purpose of the snow/ice dam bracket 40 is to prevent the sudden and major displacement of snow mass from the roof. Further, while the snow/ice dam bracket 40 has been illustrated with a rear wall having a triangular shaped upper rear wall, it will be recognized by those with skill in the art that they geometric shape of the rear wall 44 may vary. The important qualifications are that it be of a height sufficient to perform its function, but not at a height so great that it would cast a shadow over the solar cells. Still further, FIG. 3 illustrates one snow/ice dam bracket 40 per solar panel, the number and spacing of the snow/ice dam bracket on the solar panel may vary and will be dictated by the geographic area, the size of the solar panel array, and the pitch of the roof.

FIG. 10 is a perspective view of a second embodiment of the snow/ice dam bracket 40 of the present invention. It is identical to the first embodiment illustrated in FIGS. 4-8 with the exception that the resilient polymer rubber button 54 is eliminated. In this embodiment an aperture 60 is formed in the rear face 44, aperture 60 being threaded to accommodate the receipt of a thumb screw 62. This embodiment of the snow/ice dam bracket 40 would have application as an aftermarket bracket for installation on those solar arrays or matrixes in which the gap between adjacent vertical solar panels on a pitched roof would be greater than that illustrated in FIG. 7. The snow/ice dam bracket 40 as illustrated in FIG. 7 having the resilient polymer or rubber button 54 would be used on new installations where it is desirable to have the frames 12 of the solar panels in as close proximity as possible. The bracket 40 as illustrated in FIG. 7 would be installed with the solar panels such that the resilient polymer or rubber button 54 would abut or juxtapose the adjacent lower solar panel frame 12 providing further insurance against dislodgment. However, in certain installations, the gap between adjacent solar panels is greater than that illustrated in FIG. 7. In that instance, the snow/ice dam bracket 40 embodiment illustrated in FIG. 9 would be utilized with the thumb screw being tightened against the outer portion of the frame 12 of the solar panel to provide further frictional engagement to the snap fit engagement of the bracket 40 over a portion of frame 12.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A non-intrusive solar panel snow and ice dam bracket for the prevention of a sudden displacement of large amounts of snow and ice from solar panels mounted on a pitched roof, the bracket comprising:
 a planar lower wall having a width compatible with the width of a frame member of a solar panel, a perpendicular rear wall extending perpendicularly upwardly from a first edge of said bottom wall, said rear wall extending above and perpendicular to said solar panel, and a front wall formed with an acute angle with said planar lower wall forming a channel between said front and rear wall, said channel snap fit over a portion of a frame element of said solar panel, said upper portion of said rear wall extending above said solar panel serving as a dam to block or hinder the downward slide of snow and ice from said solar panel.

2. The bracket in accordance with claim 1 wherein said rear wall is formed with a threaded aperture for receipt of a threaded thumb screw to frictionally engage said portion of said frame member of said solar panel positioned between said front and rear walls of said bracket.

3. The bracket in accordance with claim 1 wherein said rear wall of said bracket is formed with a resilient bumper member extending outwardly there from, said resilient bumper member abutting and frictionally engaging a frame member of a solar panel positioned below an adjacent said bracket.

4. A non-intrusive snow and ice dam removable bracket for a solar panel mounted on a pitched roof, said solar panel
 formed of a frame member having parallel longitudinal sides and parallel lateral sides, the frame members enclosing a plurality of solar cells, said solar cells overlaid with a tempered glass member, said solar panel positioned on a pitched roof such that one frame member is lower than its opposing frame member, said removable snow and ice dam bracket comprising:
 a planar bottom wall, a rear wall perpendicular to said bottom wall, and a front wall formed at an acute angle with said bottom wall, said lower frame member of said solar panel frictionally engaged in a channel defined by said bottom wall, rear wall, and said front wall of said bracket, said rear wall of said bracket extending perpendicularly above said level of tempered glass of said solar panel to form a dam for the prevention of sudden displacement of large amounts of snow and ice accumulated on said solar panels mounted on said pitched roof.

5. The bracket in accordance with claim 4 wherein said rear wall is formed with a threaded aperture for receipt of a threaded thumb screw to frictionally engage said portion of said frame member of said solar panel positioned between said front and rear walls of said bracket.

6. The bracket in accordance with claim 4 wherein said rear wall of said bracket is formed with a resilient bumper member extending outwardly there from, said resilient bumper member abutting and frictionally engaging a frame member of a solar panel positioned below an adjacent said bracket.

* * * * *